United States Patent [19]

Ryan

[11] 4,434,686
[45] Mar. 6, 1984

[54] ADJUSTING APPARATUS

[75] Inventor: Dennis M. Ryan, San Mateo, Calif.

[73] Assignee: AMPEX Corporation, Redwood City, Calif.

[21] Appl. No.: 364,726

[22] Filed: Apr. 2, 1982

[51] Int. Cl.³ .............................................. B25B 25/00
[52] U.S. Cl. .................................... 81/3 R; 81/90 A; 279/1 K; 74/522
[58] Field of Search .................... 81/3 R, 90 A, 90 R, 81/7.5; 279/1 K, 1 H, 2 R; 73/740, 432 A; 74/522

[56] References Cited

U.S. PATENT DOCUMENTS 1,525,128 2/1925 Heise ...................................... 81/3 R
2,237,702 4/1941 Harrison ................................. 81/3 R

FOREIGN PATENT DOCUMENTS 735582 8/1955 United Kingdom ............... 279/1 K

Primary Examiner—Roscoe V. Parker
Attorney, Agent, or Firm—J. D. Talcott; C. M. Carman, Jr.

[57] ABSTRACT

To adjust the relative positions of two elements mounted for guided sliding relative motion in a first direction and in a contact plane thereof, a cylindrical adjusting tool is fitted into a reference bore in one element and rotationally and non-slippably engaging an edge of the other element. A manually operable button on the tool may be depressed to remove a cam permitting adjustment rotation of the tool, or released to secure the tool in the bore while clamping means are operated integral with the two elements, and the tool can then be removed. Substantially one-handed adjustment is thus possible leaving an operator's other hand free to operate other apparatus.

10 Claims, 3 Drawing Figures

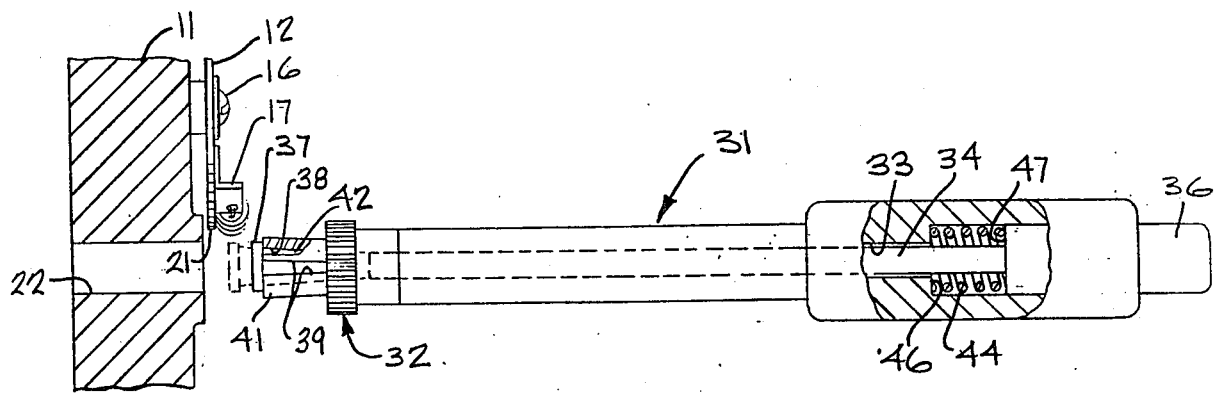
FIG_1
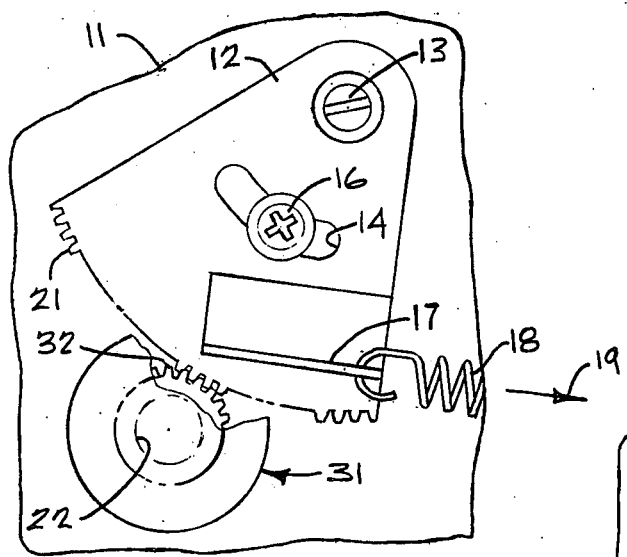
FIG_2
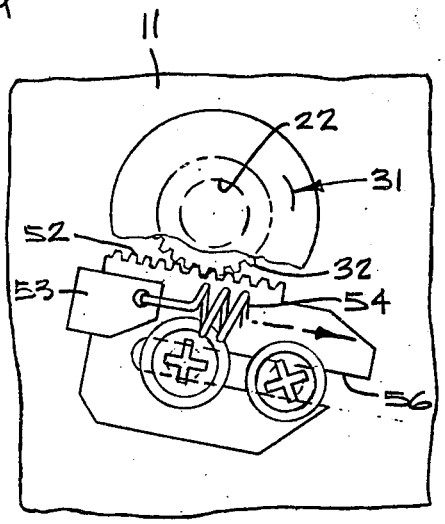
FIG_3

ADJUSTING APPARATUS

BACKGROUND OF THE INVENTION

This invention relates to adjusting apparatus and particularly to such apparatus adapted for one-handed manual operation.

In co-pending U.S. application Ser. No. 364,732, filed Apr. 2, 1982, also by the present inventor, there is disclosed a magnetic tape tensioning arm that is spring-loaded to apply tensioning forces to a tape. One end of the spring is secured to the arm and the other to an adjustable bracket secured for relative sliding motion on a mounting plate of the tape transport machine. The bracket may be secured for pivoting sliding motion on the plate or, alternatively, for rectilinear sliding motion; examples of both types are disclosed. It is important to adjust the position of the bracket on the mounting plate while the machine is operating in order to obtain precisely the correct spring distortion and resulting tape tension that is desired. To do this the mechanic-operator must hold and operate with one hand a tension sensing tool attached to the spring or to the tape tensioning arm, and it is therefore desirable that he be able to make the bracket adjustment with his other hand alone; otherwise the time for two men would be required.

It is usual in constructing brackets of this type to secure them to the mounting plate by means of at least one clamping bolt, which may be loosened to permit adjustment and then tightened when the adjustment has been completed. However, if the operator lets go of the adjusting tool to tighten the bolt, the adjusted position may be lost before the bolt can be tightened.

Accordingly it is an object of the present invention to provide an adjusting tool for a pair of elements, such tool being adapted for one-hand manual operation, and further adapt to clamp automatically in an adjusted position of the elements until clamping means integral when the elements can be secured.

SUMMARY OF THE INVENTION

To adjust the relative positions of two elements mounted for guided sliding relative motion in a first direction and in a contact plane thereof, a cylindrical adjusting tool is fitted into a reference bore in one element and rotationally and non-slippably engaging an edge of the other element. A manually operable button on the tool may be depressed to remove a cam permitting adjustment rotation of the tool, or released to secure the tool in the bore while clamping means are operated integral with two elements, and the tool can then be removed. Substantially one-handed adjustment is thus possible leaving an operator's other hand free to operate other apparatus.

DESCRIPTION OF THE DRAWING

FIG. 1 is a fragmentary side elevation, partly in section, of a pair of elements and an adjusting tool in accordance with the present invention;

FIG. 2 is a fragmentary plan view, to an enlarged scale of the apparatus shown in FIG. 1; and FIG. 3 is a fragmentary plan view, to the scale of FIG. 2, of another form of the elements to be adjusted.

DESCRIPTION OF THE PREFERRED EMBODIMENTS

Referring now to drawing, and particularly to FIGS. 1 and 2 thereof, there is shown a mounting plate 11, to which a bracket 12 is mounted for pivoting motion as by means of a pivot pin bolt 13. An arcuate slot 14 is formed in the bracket 12 and a clamping bolt 16 is threaded into the plate 11 and protrudes through slot 14. The bolt 16 maybe loosened to permit adjustment of the bracket or tightened to clamp the bracket to the plate 11 in any of the rotational positions permitted by slot 14. A flange 17 is provided on the bracket for securing one end of a helical tension spring 18 which tends to pull the bracket in the direction of arrow 19. One edge of the bracket is also provided with a row of evenly spaced gear teeth 21 formed in a arc centered on bolt 13. The plate 11 is formed with a reference bore 22 adjacent to the path of gear teeth 21.

To provide adjustment of the position of bracket 12 and a corresponding extension of and loading exerted by spring 18, an elongated right circular cylindrical adjusting element 31 is inserted into bore 22, so that a toothed flange 32 engages teeth 21 of the bracket. The clamp 16 is then loosened, and the element 31 is manually rotated until the desired adjustment is made. At this stage, it is desirable to tighten the clamping bolt 16 again, but for one one-handed operation, something more is needed to ensure that spring 18 will not cause the adjustment to be lost when the element 31 is manually released so that the operator's hand can grasp a tool for the bolt 16.

Accordingly, the element 31 is formed with a central bore 33 into which is fitted an elongated shaft 34, which protrudes from a first end of the element 31 to define a manually operable button 36, and the shaft 34 likewise protrudes from the other (second) end of element 31 to define a flanged tip 37 easily insertable in bore 22. The bore 33 is enlarged at the second end to define a hollow conical cam-follower recess 38 opening divergingly outwardly toward the second end, and the corresponding portion of element 31 is slotted longitudinally as at 39 to permit radial expansion of the end surface 41 to frictionally engage the interior wall of bore 22 so as to at least temporarily secure the bracket 12 when the adjustment is completed, but before bolt 16 has been tightened.

To urge such expansion, the portion 42 of shaft 34 is enlarged to define a conical cam surface mating with surface 39, and shaft 34 is spring-loaded toward the expanded position of surface 41 as by means of a coil compression spring 44 bearing against confronting shoulders 46 on the element 31 and 47 on the shaft 34.

Thus it will be seen that the button 36 must be depressed to permit insertion of the tool 31 and rotation thereof to adjust the bracket, but release of the button causes the surface 41 to expand and secure the tool in bore 22. All this can be done with a single hand. This hand may then be used to tighten bolt 16, following which the button may again be depressed and the tool removed.

FIG. 3 illustrates a rectilinearly sliding form of bracket 51 having teeth 52 in a straight line, a flange 53 for securing a spring 54, and a rectilinear slot 56 through which a pair of clamping and guide bolts 58 and 59 may be threaded to mounting plate 11, which also has a reference bore 22 adjacent to teeth 52 for insertion of tool 31.

What is claimed is:

1. Apparatus for the relative positional adjustment of a pair of elements having freedom of relative motion in a first direction, characterized in that:

a first of said elements is relieved to define a reference bore adjacent an edge of the other and second element, said bore having an axis lying in a plane normal to said first direction;

an adjusting element is provided fitting for snug rotation in said bore;

said adjusting element having a portion engaging said second element in substantially non-slip engagement for causing said relative motion of said first and second elements upon rotation of said adjusting element in said bore; and means are provided for securing said adjusting element against rotation in said bore when a desired adjustment has been completed.

2. Apparatus as recited in claim 1, wherein said adjusting element is of elongated right-circular cylindrical shape to define a manually rotatable shaft, and said portion of the apparatus engagable with the second element is a co-axial flange extending radially from the shaft.

3. Apparatus as recited in claim 2 wherein:

said edge of said second element is formed with evenly spaced gear teeth extending in said first direction; and said flange is provided with an arcuate array of gear teeth meshing with the teeth of said second element to provide said non-slip engagement for causing said relative motion.

4. Apparatus as recited in claim 3 wherein said first and said second elements have confronting planar faces engaging one another for sliding contact in said first direction, and said bore is axially normal to said planar faces.

5. Apparatus as recited in claim 4 wherein said first direction is rectilinear and said edge of said second element is generally parallel thereto, and guide means are provided for guiding said pair of elements in said first direction of relative motion.

6. Apparatus as recited in claim 4, wherein said first direction is arcuately curvilinear and said second element is mounted on said first element for pivoting motion relative thereto.

7. Apparatus as recited in claim 4, wherein one of said first and second elements has a slot formed therein and extending in said first direction, and a clamping bolt is mounted in said slot and threated into the other of said first and second elements to clamp said elements together when adjustment has been completed.

8. Apparatus as recited in claim 4, wherein said adjusting element has a cylindrical end portion fitting for said snug rotation in said bore;

said end portion being relieved to define a conically shaped hollow interior portion presenting an expansion cam-follower surface opening divergingly toward said end thereof;

said end portion is longitudinally slotted to permit radial expansion thereof to frictionally engage the walls of said bore in said first element to provide said securing action thereof; and a conforming conical cam element is provided in said hollow interior portion for causing said expansion of said end portions;

said cam element being spring loaded in the expansion-causing direction and being manually movable in the opposite direction for temporary radial collapse of said end portion to permit said rotation in said bore.

9. Apparatus as recited in claim 8, wherein said adjusting element defines a central bore extending from said hollow conical-shaped interior portion to the other end of said adjusting element; and said cam element has an elongated shaft extending to such central bore and protruding from said other end of said adjusting element to define a manually depressable button for moving said cam element in said opposite direction to temporarily permit said rotation in said bore of said first element.

10. Apparatus as recited in claim 9, wherein said adjusting element is also manually removable and insertable in said first element bore when said button is manually depressed.

* * * * *

UNITED STATES PATENT AND TRADEMARK OFFICE
CERTIFICATE OF CORRECTION

PATENT NO. : 4,434,686        Page 1 of 2
DATED      : March 6, 1984
INVENTOR(S): Dennis M. Ryan It is certified that error appears in the above-identified patent and that said Letters Patent is hereby corrected as shown below:

Column 4, line 6, "threated" should read --threaded--.

Fig. 3, should be deleted to appear as per attach Fig.

Signed and Sealed this

Twenty-seventh Day of August 1985

[SEAL]

Attest:

DONALD J. QUIGG

Attesting Officer          Acting Commissioner of Patents and Trademarks

UNITED STATES PATENT AND TRADEMARK OFFICE
CERTIFICATE OF CORRECTION

PATENT NO. : 4,434,686  Page 2 of 2

DATED : March 6, 1984

INVENTOR(S) : Dennis M. Ryan

It is certified that error appears in the above-identified patent and that said Letters Patent is hereby corrected as shown below:

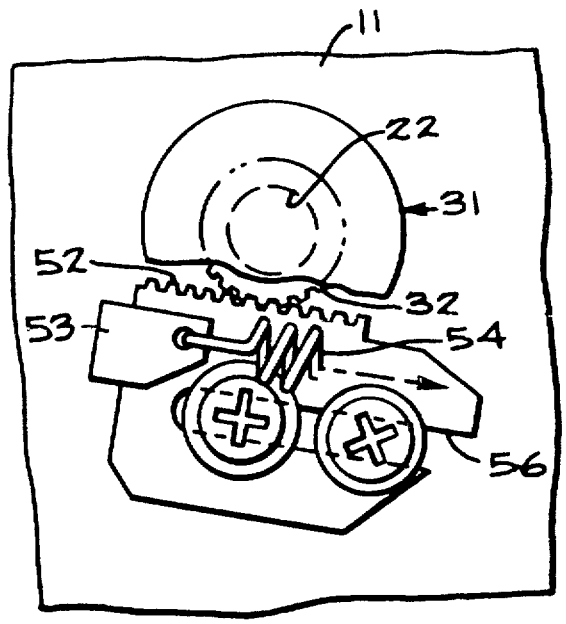

FIG_3